(12) United States Patent
Shepherd et al.

(10) Patent No.: US 12,130,298 B1
(45) Date of Patent: Oct. 29, 2024

(54) MATERIAL ANALYZERS AND RELATED SYSTEMS AND METHODS

(71) Applicant: Cornerstone Research Group, Inc., Miamisburg, OH (US)

(72) Inventors: James E. Shepherd, Porter Ranch, CA (US); Mary T. Parrish, Kettering, OH (US); Ian M. Fuller, Bellbrook, OH (US); Ryan D. Snyder, Dayton, OH (US)

(73) Assignee: Cornerstone Research Group, LLC, Miamisburg, OH (US)

( * ) Notice: Subject to any disclaimer, the term of this patent is extended or adjusted under 35 U.S.C. 154(b) by 326 days.

(21) Appl. No.: 17/743,866

(22) Filed: May 13, 2022

Related U.S. Application Data

(60) Provisional application No. 63/188,536, filed on May 14, 2021.

(51) Int. Cl.
*G01N 35/00* (2006.01)
*B33Y 30/00* (2015.01)
*B33Y 50/00* (2015.01)

(52) U.S. Cl.
CPC ........ *G01N 35/00584* (2013.01); *B33Y 30/00* (2014.12); *B33Y 50/00* (2014.12)

(58) Field of Classification Search
CPC ....... G01L 5/0076; G01L 5/107; B33Y 30/00; B33Y 50/00; B33Y 50/02; G01N 35/00584
See application file for complete search history.

(56) References Cited

U.S. PATENT DOCUMENTS

| | | | | |
|---|---|---|---|---|
| 3,395,200 | A * | 7/1968 | Mader, Jr. | D01D 10/02 264/40.6 |
| 6,607,157 | B1 * | 8/2003 | Duescher | B65H 27/00 242/417.3 |
| 2017/0190534 | A1 * | 7/2017 | Mabuchi | B65H 23/24 |

* cited by examiner

*Primary Examiner* — Paul M. West
(74) *Attorney, Agent, or Firm* — TraskBritt

(57) ABSTRACT

In-line material analyzers may include feed guides for guiding a material through the analyzer. An actuator may be positioned and configured to contact the material proximate to the feed guides. The state of the actuator, and the force applied by the actuator to the material, may be detected. The state of the actuator, the force applied by the actuator, or both may be utilized to determine one or more properties of the material. Such a determination may be made without removing the material from a production or other manufacturing line, such as, for example, while the material remains contiguous with a source from which the material is extruded.

20 Claims, 6 Drawing Sheets

MATERIAL ANALYZERS AND RELATED SYSTEMS AND METHODS

PRIORITY CLAIM

This application claims the benefit of the filing date of U.S. Provisional Patent Application Ser. No. 63/188,536, filed May 14, 2021, for "IN-LINE MATERIAL ANALYZER," the disclosure of which is hereby incorporated herein in its entirety by this reference.

STATEMENT REGARDING FEDERALLY SPONSORED RESEARCH OR DEVELOPMENT

This invention was made with U.S. Government support under Contract No. 80NSSC19C0135 awarded by the National Aeronautics and Space Administration to Cornerstone Research Group Inc. The U.S. Government has certain rights in the invention.

TECHNICAL FIELD

This disclosure relates generally to material analyzers for filaments and other continuously manufactured materials. More specifically, disclosed embodiments relate to material analyzers capable of determining one or more material properties of a material while the material is in motion, passing through the material analyzer.

BACKGROUND

To maintain quality control of material production and evaluating product performance during continuous material production processes, sampling of the material being produced followed by tests or characterization using external equipment is often required. These tests or characterizations may evaluate product properties of interest to the market such as stiffness, strength, color, electrical conductivity, thermal conductivity, hardness, lubricity, etc. The sampling process involved may be manual or automated but often requires additional labor and/or capital to obtain and handle the samples to provide relevant data. In addition, care must be taken to ensure the sample quantity is sufficient to provide a representative data set. Sample quantities are often kept at a minimum as the samples are generally destructively evaluated or are otherwise not able to re-enter the production process.

BRIEF SUMMARY

In some examples, material analyzers for testing a property of a material may include a feed guide for guiding intake of a material and an exit guide. The feed guide and the exit guide may be configured to allow the material to move through the feed guide and the exit guide while the material is analyzed by the material analyzer. An actuator may be positioned to displace the material when the material is between the feed guide and the exit guide. A position sensor may be configured to track a position of the actuator. A force sensor may be configured to measure a force required to cause the actuator to displace the material.

In other examples, methods of characterizing a property of a material, may involve receiving a material into a feed guide of a material analyzer and advancing the material from the feed guide toward an exit guide. The material may be displaced when the material is between the feed guide and the exit guide and while the material is advancing from the feed guide toward the exit guide. A position of the material may be tracked while displacing the material and a force required to displace the material may be measured.

In other examples, systems for analyzing a property of a material, may include a source of a material, a material analyzer, and a receptacle positioned and configured to receive the material from the material analyzer. The material analyzer may include a feed guide positioned and configured to receive the material from the source and an exit guide. The feed guide and the exit guide may be configured to allow the material to move through the feed guide and the exit guide while the material is analyzed by the material analyzer. An actuator may be positioned to displace the material when the material is between the feed guide and the exit guide. A position sensor may be configured to track a position of the actuator. A force sensor may be configured to measure a force required to cause the actuator to displace the material.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings. In the drawings:

DETAILED DESCRIPTION

Figure 1:
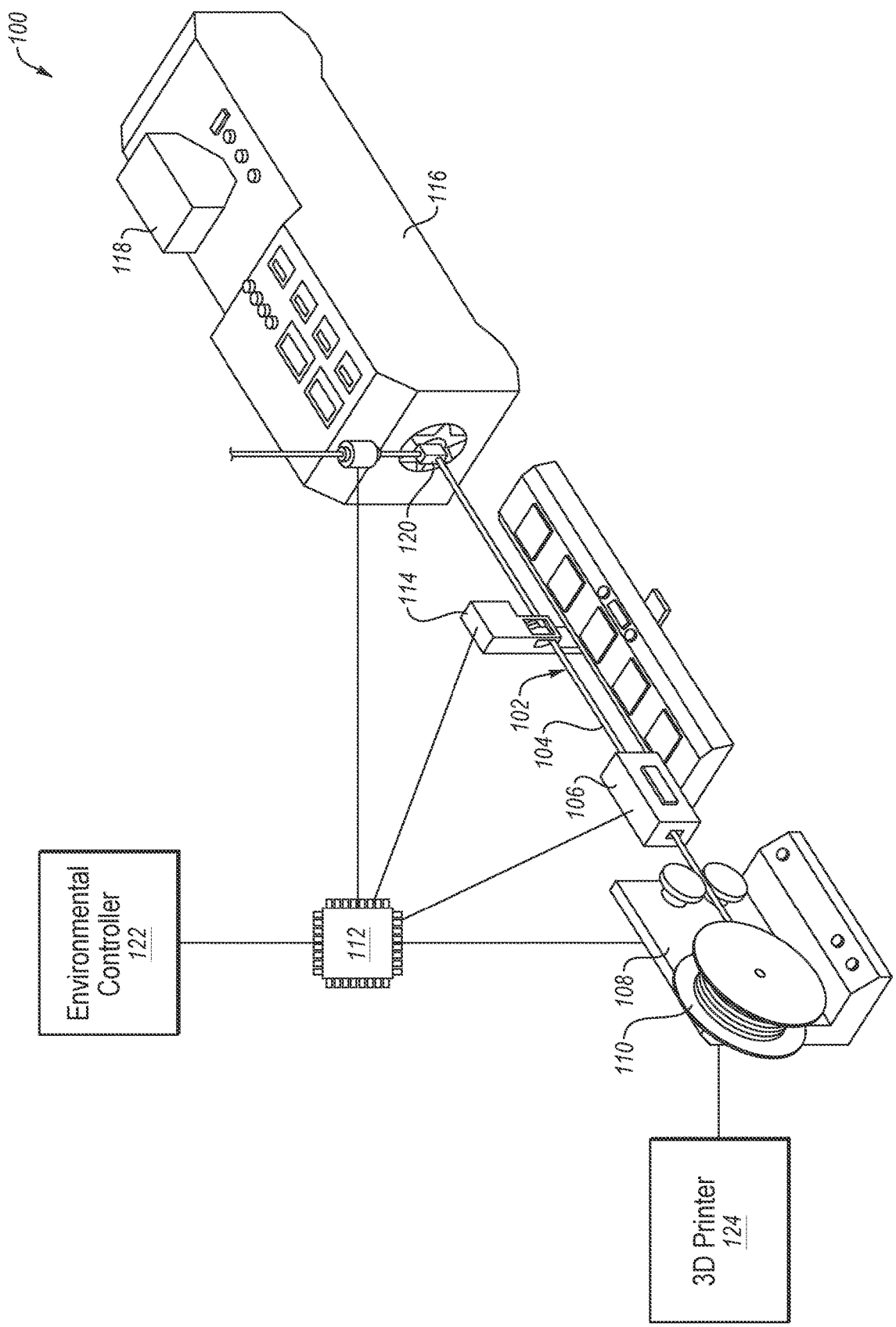
FIG. 1 is a schematic view of a system for analyzing a filament, or other extruded or pultruded material, including a material analyzer in accordance with this disclosure.

Disclosed embodiments relate generally to material analyzers capable of determining one or more material properties of a material while the material is in motion, passing through the material analyzer. More specifically, disclosed are embodiments of material analyzers having a combination of fixed and movable guides capable of receiving a filament or other extruded or pultruded material. Displacement of the movable guides, and the force to achieve displacement of the movable guides, may be measured, enabling a flexural modulus of the material to be determined. In embodiments where the displacement of the movable guides is not fixed (e.g., oscillates), the measured displacement and force may also enable the storage modulus and the loss modulus of the material to be determined. In some embodiments, the material analyzer may include one or more additional sensors positioned and configured to determine additional characteristics of the material and/or the environment.

Material analyzers in accordance with this disclosure may include feed guides for guiding a material through the analyzer. An actuator may be positioned and configured to contact the material proximate to the feed guides. The state of the actuator, and the force applied by the actuator to the material, may be detected. The state of the actuator, the force applied by the actuator, or both may be utilized to determine one or more properties of the material. Such a determination may be made without removing the material from a production or other manufacturing line, such as, for example, while the material remains contiguous with a source from which the material is extruded and/or while the material remains contiguous with a 3D printer utilizing the material in an additive manufacturing process.

Issues related to sampling and testing are exceptionally relevant to production processes such as extruding or drawing where lengths of product are progressively moved through a production process via a pushing or pulling force acting on other sections of product. In these cases, the need to sample represents not only an additional resource drain and lost revenue, but also complicates the manufacturing process when continuous lengths must be broken to obtain the sample.

The material analyzers disclosed herein may incorporate one or more sub-systems to characterize one or more properties of a product, which may take place during a continuous production process and without the need to stop the production or remove samples and characterize them outside to the flow of production in some embodiments. In such embodiments, the in-line material analyzer may be used to measure mechanical properties of continuously manufactured material products of, for example, polymer, metal, glass, carbon, or composites in the form of, as continued examples, filament, tape, tube, wire, cable, beam, channel, or fiber.

Material analyzers and systems in accordance with this disclosure may be used to measure the stiffness (i.e., flexural modulus) of a polymeric filament or other extruded or pultruded material in a production line, as the material is being manufactured. As one example, a source of material in the form of an extruder may melt a polymeric material and extrudes the molten polymer through a shaping die. The filament may then be directed through various steps including cooling, diameter measurements, and characterization by a material analyzer before being wound on a spool for storage and use in additive manufacturing. In some examples, the material may be cut or otherwise separated into discrete masses (e.g., pellets), which cutting may occur after or instead of winding onto a spool. During cooling, measuring, and characterization, the filament may remain contiguous with the source material.

In some examples, the material analyzer may include two sets of rollers mounted in fixed position on a fixture or a frame. A third set of movable rollers may be located between the two fixed sets of rollers. The movable rollers may be connected to an actuator capable of moving in a direction perpendicular to an axis of rotation of the rollers. In some examples, the rollers of the material analyzer may further include guides or grooves to preferentially guide the direction of movement of the filament or other extruded or pultruded material through the rollers and through the material analyzer. All three sets of rollers may be lined up in series with each other, and material may pass through all three sets of rollers during analysis by the material analyzer. During operation of the material analyzer, a polymer filament or other continuously manufactured material may enter one of the fixed, outer sets of rollers, proceed through the center set of movable rollers, and exit through the third set of fixed, outer rollers (e.g., before continuing on to other in-line processes). While the material is passing through the three sets of rollers, the linear actuator connected to the center set of movable rollers may measure the real-time force and position associated with the movement of the passing filament in the direction of actuation to enable the material's stiffness and modulus to be determined.

Illustrative components of the of a material analyzer in accordance with this disclosure may include an actuator, a force sensor, and an alignment and clamping system that is capable of enabling materials that are produced by a continuous production process (e.g., plastic filament extrusion) to pass through the alignment and clamping system. The actuator may deflect the passing material to a defined and/or measurable displacement, and the force sensor may be configured to measure the force at the known deflection. In some examples, the actuator and the force sensor may be combined in a single device. In other examples, the actuator and force sensor may be separate components. In some examples, the alignment and clamping system may include at least three sets of rollers in series with one another, each respective set having two rollers capable of free rotation around their respective axes of rotation. The two outer sets of rollers may be fixed in position in relation to the height at which the passing material enters into, and exits from, the alignment and clamping system of the material. There may be at least one center set of rollers connected to a corresponding linear actuator per set of center rollers, which may be configured to deflect the passing material in a direction perpendicular to the axis of rotation of the rollers to a specified and/or measurable displacement. In some examples, there may be two sets of center set of rollers that are connected to the same linear actuator or to separate linear actuators, one per set of rollers. Due to the freely rotatable nature of the rollers, the continuous movement of the passing material may not be disrupted during characterization of the material by the material analyzer.

The material analyzer may use a dual-cantilever, clamping operation for the material characterization. In principle, there are four variables used to determine the elastic modulus of a cylindrical material using a dual cantilever setup—length of the specimen (L), deflection at the center point (d), force at the deflection point (F), and the radius of the filament (r).

In the material analyzer, the length of the specimen used in the calculation is the distance between the two center points of the outer sets of rollers, the deflection of the material is the displacement of the actuator and/or the center set(s) of rollers, and the deflection force is measured by the force sensor. In some examples, the diameter of extruded polymer filament (or other continuously manufactured material) is measured using an in-line, automatic sensor configured to measure the diameter by mechanical or optical means so that inconsistencies in the geometry can be accounted for in the modulus calculations. The equation used for calculating the modulus, assuming a cylindrical material sample, is shown below:

$$E_{DC\_Cylinder} = \frac{FL^3}{6d\pi r^4}$$

In some examples, at least one roller may include a groove to improve clamping performance to guide the movement of the passing material, to inhibit misalignment of the material, and to improve the reliability of the modulus calculation. In some such examples, the groove may have a concave shape generally matching shape of the passing material (e.g., when the material is a round filament) to increase contact area between the roller(s) and the material.

Unlike Dynamic Mechanical Analyzers (DMAs) known to the inventors, where the sample may be isolated and fixed on the equipment, material analyzers in accordance with this disclosure may maintain the elevation of the sample fixed within the outer portions of the alignment and clamping system, may utilize the central portion of the alignment and clamping system to deflect the sample, and may allow the sample to be continuously moved through the alignment and clamping system of the material analyzer while maintaining a fixed length of the sample for measurement of the mechanical properties of the sample. In some examples, the outer rollers may work as clamps for the material (e.g., may clamp the material between the rollers while permitting the material to move through the rollers), may have a one-inch radius, and may be made from a soft polyurethane material (e.g., having a Shore durometer of 30 A) selected with the intent to grip the sample material as it passes through the material analyzer.

There are four illustrative modes of operation for the in-line material analyzer: (1) Fixed actuator displacement, static feedstock; (2) Fixed actuator displacement, moving feedstock; (3) Oscillating actuator, static feedstock; (4) Oscillating actuator, moving feedstock. Modes 2 and 4 enable characterization of material properties during continuous production of materials from manufacturing process, such as, for example, filament extrusion. In some examples, the center set of rollers may be actuated to a defined perpendicular displacement with respect to the feeding direction of the filament through the in-line mechanical analyzer. The force exerted by the passing filament on the linear actuator connected to the center set of rollers will be measured continuously to provide mechanical property data for the filament. In other examples, the center set of rollers may be oscillated between to defined displacement values, perpendicularly with respect to the feeding direction of the filament through the in-line mechanical analyzer. When such oscillation is performed for a polymeric sample, material properties, such as, for example, storage and loss moduli as a function of frequency of oscillation, may be determined from the force and displacement data obtained from the linear actuator and the force sensor.

The illustrations presented in this disclosure are not meant to be actual views of any particular system for analyzing a material, material analyzer, guide, or component thereof, but are merely idealized representations employed to describe illustrative embodiments. Thus, the drawings are not necessarily to scale.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

FIG. 1 is a schematic view of a system 100 for analyzing one or more properties of a filament 102, or other extruded or pultruded material 104, including a material analyzer 106 in accordance with this disclosure. The system 100 may include, for example a source 118 of the material 104. The source 118 may be configured, for example, to provide a known material 104 in a known shape and form. The source 118 may include, for example, an extruder 116, a pultruder, or another apparatus for continuously manufacturing and outputting a material 104. More specifically, the source 118 may include an extruder 116, and the material 104 may be drawn through a die 110 of the extruder to form an elongated mass (e.g., a filament 102, a fiber) of the material extending from the source 118. As another example, the source 118 may include a spool 110 having a preformed quantity of the material 104.

The source 118 may be configured to form or provide the material 104 in the form of, for example, an elongated, contiguous mass of the material 104 having a predefined cross-sectional geometry. More specifically, the source 118 may be configured to form or provide the material 104 in the form of, for example, a filament 102, tape, tube, wire, cable, beam, channel, or fiber comprising the material 104. The material analyzer 106 may be capable of analyzing properties of various materials 104 formed and/or provided by the source 118. For example, the source 118 may be configured to provide a material 104 including a polymer, metal, glass, carbon, or composite material for analysis by the material analyzer 106.

The system 100 may also include a material analyzer 106 located downstream of the source 118, and positioned and configured to receive the material 104 from the source 118 or another component, device, or system interposed between the source 118 and the material analyzer 106 for analysis of one or more properties of the material 104. For example, the material analyzer 106 may be configured to determine flexural modulus of a material 104 received by the material analyzer 106. In some examples where the material 104 includes a polymer material, the material analyzer 106 may be configured to determine flexural modulus, loss modulus, storage modulus, or any combination or subcombination of these properties of the material 104. The material 104 may be received from the source 118 and introduced into the material analyzer 106, for example, manually by an operator of the system 100 or automatically by guides and/or robotic arms of the system 100.

In some examples, the material analyzer 106 may be configured to perform a three-point flexural test or a four-point flexural test to determine one or more properties of the material 104. More specifically, the material analyzer 106 may be configured to at least substantially continuously perform a three-point flexural test or a four-point flexural test on a material 104 in motion through the material analyzer 106.

In some such examples, a controller 112 may receive the measured displacement of the material 104 as well as the measured force at the measured displacement to allow the controller 112 to determine one or more properties of the material 104. More specifically, the controller 112 may receive signals from a position sensor indicative of the displacement of the actuator(s) and material 104 and signals from a force sensor indicative of the force required to maintain and/or achieve that displacement. As a specific, nonlimiting example, the controller 112 may associate the displacement of the material 104 and the force at that displacement with a specific time and/or location along the length of the material 104, such that the property or properties of the material 104 can be tracked and associated with specific portions of the material 104 along its length.

The system 100 may include one or more additional sensors 114 positioned and configured to determine one or more other characteristics and/or properties of the material 104 or the surrounding environment. For example, the sensor 114 may be orientable toward or placeable in contact with the material 104, and may be configured to detect one or more of a temperature of the material 104, a color of the material 104, a size (e.g., a diameter) of the material 104, an electrical resistivity of the material 104, or a tension of the material 104 during characterization by the material analyzer 106. As another example, the sensor 114 may be orientable toward an environment proximate to the material 104, and may be configured to detect one or more of an ambient temperature proximate to the material 104 or an ambient humidity proximate to the material 104. The controller 112 may also be connected to, and receive signals indicative of the properties detected by, the sensor 114 or sensors 114. In some examples, the controller 112 may associate the additional properties with a specific time and/or location along the length of the material 104, such that the additional properties of the material 104 can be tracked and associated with specific portions of the material 104 along its length.

One or more of the additional sensors 114 may be upstream of the material analyzer 106 (e.g., located in the source 118 or interposed between the source 118 and the material analyzer 106). One or more of the additional sensors 114 may be incorporated into the material analyzer 106, and may concurrently measure the additional properties while the material analyzer 106 measures displacement and force at displacement of the material 104. One or more of the additional sensors 114 may be located downstream of the material analyzer 106 (e.g., located in a receptacle 108 for receiving the material 104 from the material analyzer 106 or interposed between the material analyzer 106 and the receptacle 108). In some examples, the system 100 may include the additional sensors 114 in one, some, or all of the above locations.

The system 100 may also include a receptacle 108 positioned and configured to receive the characterized material 104 from the material analyzer 106 (and from any intervening sensors 114). In some examples, the receptacle 108 may be configured to utilize the material 104 as part of an additive manufacturing process performed by the system 100. For example, the receptacle 108 may include a 3D printer 124. In other examples, the receptacle 108 may be configured to store the material 104 for future use. For example, the receptacle 108 may include a spool 110 for receiving a coiled length of the material 104. In still other examples, the receptacle 108 may be configured to both store and use the material 104. For example, the receptacle 108 may include the spool 110 and the 3D printer 124. In some examples, the receptacle 108 may be configured to draw the material 104 from the source 118, through the material analyzer 106 and past any relevant sensors 114, to the receptacle 108. For example, a spool 110 of the receptacle 108 may include a winder (e.g., a motor configured to rotate the spool 110) to draw the material 104 through the system 100.

In some examples, the controller 112 may be configured to provide the property or properties of the material 104 detected and/or calculated utilizing the material analyzer 106 and any sensors 114, and/or control signals responsive to the property or properties of the material 104, to the source 118, to the receptacle 108, or to the source 118 and to the receptacle 108. For example, the controller 112 may provide the property or properties of the material 104 detected and/or calculated utilizing the material analyzer 106 and any sensors 114, and/or control signals responsive to the property or properties of the material 104, to the source 118 as feedback to change at least one operational parameter used by the source 118 to output the material (e.g., temperature, speed of production), when the source 118 is a continuous manufacturing device (e.g., an extruder 116, a pultruder). More specifically, the controller 112 may send a control signal configured to change at least one operational parameter of an extruder 116 or pultruder of the source 118 at least partially responsive to receiving the position of an actuator of the material analyzer 106 from a position sensor and the force required to move the actuator from a force sensor.

As another example, the controller 112 may provide the property or properties of the material 104 detected and/or calculated utilizing the material analyzer 106 and any sensors 114, and/or control signals responsive to the property or properties of the material 104, to the receptacle 108 as feed forward to change at least one operational parameter used by the receptacle 108 when receiving the material (e.g., speed of draw onto a spool 110) and/or when utilizing the material 104 in an additive manufacturing process (e.g., temperature, rate of feed, speed of movement, size and/or position of internal reinforcement). More specifically, the controller 112 may send a control signal configured to change at least one operational parameter of a spool 110 and/or 3D printer 124 of the receptacle 108 at least partially responsive to receiving the position of an actuator of the material analyzer 106 from a position sensor and the force required to move the actuator from a force sensor.

As yet another example, the controller 112 may provide the property or properties of the material 104 detected and/or calculated utilizing the material analyzer 106 and any sensors 114, and/or control signals responsive to the property or properties of the material 104, to an environmental controller 122 as feedback to change at least one operational parameter used by the environmental controller 122 when controlling the ambient environment proximate to the system 100 and the material 104. More specifically, the controller 112 may send a control signal configured to change at least one operational parameter of a humidifier, dehumidifier, cooler, heater, and/or gas source (e.g., tank of argon) of the environmental controller 122 at least partially responsive to receiving the position of an actuator of the material analyzer 106 from a position sensor and the force required to move the actuator from a force sensor.

The foregoing feedback and feed forward control provided by the controller 112 may be combined with one another, altogether as a whole or in subcombinations. Providing responsive control over the operational parameters used by various components of the system 100 may enable the properties of the material 104 output by the apparatus of the disclosure to be more consistent (e.g., within set tolerances) throughout a length and/or batch of the material 104. For example, when the properties of the material 104 are outside specification, the controller 112 may change at least one operational parameter of the source 118 to more quickly bring the material 104 and its properties back within specification. Providing such control may also increase the consistency and reliability of the resulting product, which may be in the form of, for example, a spool 110 of the material 104 and/or an additively manufactured part. For example, when the properties of a part being additively manufactured utilizing the material 104 are outside specification, the controller 112 may change at least one operational parameter of the 3D printer 124 to more quickly bring the part and its properties back within specification.

The controller 112 may be implemented as, for example, a microprocessor, Field Programmable Gate Array (FPGA), Application Specific Integrated Circuit (ASIC), or other processing unit, to control the processing of system functions and requests in the electronic system 100. The controller 112 may be implemented, for example, as a component of the source 118, material analyzer 106, one or more sensors 114, receptacle 108, environmental controller 122, an external workstation or other control unit, or many individual devices distributed among one or more of the foregoing.

In additional embodiments, the source 118 may be configured to provide a first quantity of the material 104 to the material analyzer 106 for analysis, and to provide a second, different quantity of the material 104 to another component of the system 100, such as, for example, another receptacle. For example, a small quantity of the material 104 may be diverted to the material analyzer 106 for characterization and sent to a receptacle 108 in the form of a spool 110 for potential use or discard. A remainder of the material 104 may not be characterized, and may be sent directly to another receptacle, such as a spool of product for sale or a 3D printer for use in an additive manufacturing process. The detected properties of the sample material 104 diverted to the material analyzer 106 may be used as representative of the properties of the remainder of the material 104.

Figure 2:
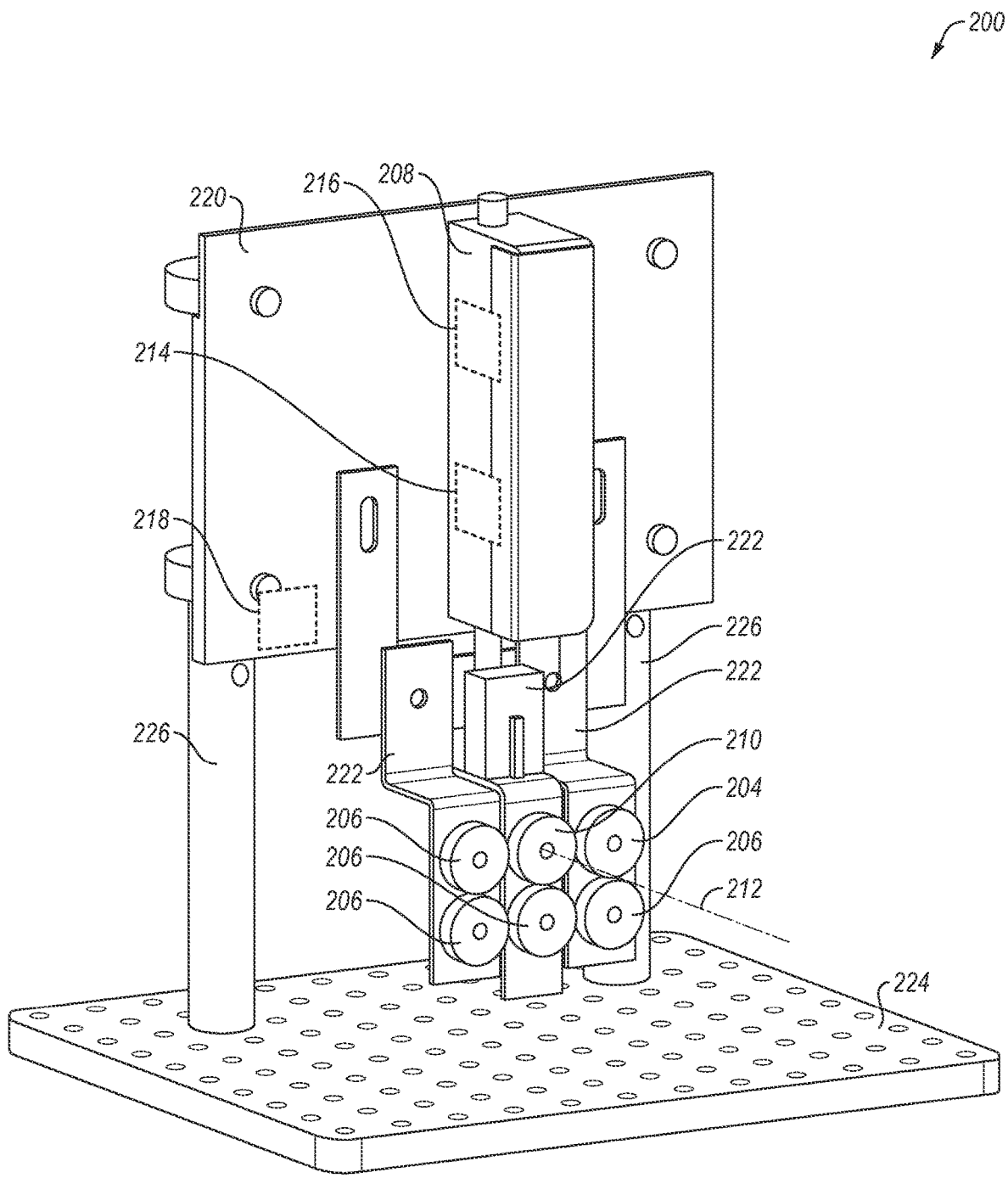
FIG. 2 is a perspective side view of a material analyzer usable with the system of FIG. 1.

FIG. 2 is a perspective side view of a material analyzer 200 usable with the system 100 of FIG. 1. The material analyzer 200 may be configured to test and enable determination of one or more properties of a material. The material analyzer 200 may include, for example, a feed guide positioned and configured to guide intake of a material into the material analyzer 200. The material analyzer 200 may also include an exit guide 204 positioned and configured to guide the material as it exits the material analyzer 200, post-characterization. More specifically, the feed guide 202 and the exit guide 204 may be configured to allow the material to move through the feed guide 202 and the exit guide 204 while the material is analyzed by the material analyzer 200.

In some examples, the feed guide 202 and the exit guide 204 may include rollers 206. For example, each of the feed guide 202 and the exit guide 204 may include a respective pair of rollers 206, which may be positioned and configured to receive the material between the rollers 206 and to rotate and remain in contact with the material as the material passes through the rollers 206. More specifically, lines tangent to the rollers 206 of the feed guide 202 at the point where the rollers 206 are closest to one another may at least substantially align with lines tanged to the rollers 206 of the exit guide 204 at the point where those roller 206 are closest to one another. As a specific, nonlimiting example, the rollers 206 of each of the feed guide 202 and the exit guide 204 may be configured to receive and output material in an at least substantially horizontal orientation. In some examples, the feed guide 202 and the exit guide 204 may be in at least substantially fixed locations, such that a distance between the feed guide 202 and the exit guide 204 may be fixed and an elevation of the feed guide 202 and the exit guide 204 may likewise be fixed.

The material analyzer 200 may also include at least one actuator 208 positioned and configured to displace the material when the material is between the feed guide 202 and the exit guide 204. The actuator 208 may include, for example, a linear actuator, a hydraulic actuator, a pneumatic actuator, or other actuators known in the art. A given actuator 208 may be secured to, and configured to move, a corresponding displaceable guide 210 positioned and configured to support and guide the material as the material is displaced by the actuator 208. More specifically, the guide 210 may be positioned and configured to guide the material during characterization. As a specific, nonlimiting example, the guide 210 may be configured to allow the material to move through the guide 210 while the material is characterized by the material analyzer 200.

In some examples, the guide 210 may include rollers 206. For example, the guide 210 may include a respective pair of rollers 206, which may be positioned and configured to receive the material between the rollers 206 and to rotate and remain in contact with the material as the material passes through the rollers 206. The rollers 206 of the guide 210 may be displaceable in a direction at least substantially perpendicular to axes axis of rotation 212 of the rollers 206 to assist in characterizing one or more properties of the material passing through the rollers 206. As a specific, nonlimiting example, the rollers 206 of the guide 210 may be displaceable at least substantially vertically to provide a corresponding displacement of the material as the material passes from the feed guide 202, through the guide 210, and out the exit guide 204. In other examples, the guide 210 may include a post or other structure including low-friction contact material (e.g., nylon) for the material to glide across. In some examples, a distance between the feed guide 202 and the guide 210, and between the guide 210 and the exit guide 204, when the rollers 206 of the guide 210 are at least substantially aligned with the corresponding rollers 206 of the feed guide 202 and the exit guide 204, may be fixed.

The material analyzer 200 may include a position sensor 214 configured to track a position of the actuator 208. The position sensor 214 may include, for example, a stepper counter in embodiments where the actuator 208 includes a stepper motor, an infrared or other optical distance sensor, a laser distance sensor, an ultrasonic or other sonic distance sensor, or other position sensors known in the art. The position sensor 214 may be connected to a controller 112 (see FIG. 1) for receiving a signal indicative of the displacement of the material in the guide 210 movable by the actuator 208 relative to the fixed feed guide 202 and exit guide 204.

The material analyzer 200 may further include a force sensor 216 configured to measure a force required to cause the actuator 208 to displace the material. The force sensor 216 may include, for example, a strain gauge, a transducer, a piezoelectric load cell, an inductive load cell, a capacitive load cell, or other force sensors known in the art. The force sensor 216 may be connected to a controller 112 (see FIG. 1) for receiving a signal indicative of the force required to achieve the measured displacement of the material in the guide 210 movable by the actuator 208 relative to the fixed feed guide 202 and exit guide 204.

In some examples, the material analyzer 200 may be configured to cause the actuator 208 to maintain the material, and the guide 210, at an at least substantially fixed displacement. For example, a controller 112 (see FIG. 1) connected to the actuator 208 and the position sensor 214 may receive the position of the material, and the guide 210, or a signal representative thereof from the position sensor 214 and send control signals to the actuator 208 to cause the actuator 208 to change force of actuation to maintain an at least substantially constant displacement.

In other examples, the material analyzer 200 may be configured to cause the actuator 208 to oscillate a displacement of the material, and the guide 210. For example, a controller 112 (see FIG. 1) connected to the actuator 208 and the position sensor 214 may receive the position of the material, and the guide 210, or a signal representative thereof from the position sensor 214 and send control signals to the actuator 208 to cause the actuator 208 to change force of actuation to at least substantially continuously vary displacement of the material, and the guide 210, following a predetermined, oscillating pattern.

In some examples, the material analyzer 200 may be configured to determine at least a flexural modulus of the material responsive to tracking the position of the material utilizing the position sensor 214 and measuring the force required to displace the material utilizing the force sensor 216. In examples, where the specimen is cylindrical (e.g., a filament having an at least substantially circular cross-section), the following equation may be utilized by a controller 112 (see FIG. 1) of the material analyzer 200 to calculate the flexural modulus of the material:

$$E_{DC\_Cylinder} = \frac{FL^3}{6d\pi r^4}$$

In the foregoing equation, L is the length of the specimen (known or determinable from the positions of the feed guide 202, guide 210, and exit guide 204 and the shape of the specimen), d is the deflection (measured or determinable utilizing the position sensor 214), F is the force at the deflection point (measured utilizing the force sensor 216), and r is the radius of the specimen (known from the specification or measured or determined as described in more detail below).

In some examples where the displacement of the material, and the guide 210, oscillates, the material analyzer 200 may be configured to a storage modulus, a loss modulus, or a storage modulus and a loss modulus of the material responsive to tracking the position of the material utilizing the position sensor 214 and measuring the force required to displace the material utilizing the force sensor 216. More specifically, storage modulus, loss modulus, or storage modulus and loss modulus may be calculated utilizing software configured to analyze viscoelastic behavior of the material responsive to measurements of the deflection and force, as well as other potential variables, as known in the art. As a specific, nonlimiting example, storage modulus, loss modulus, or storage modulus and loss modulus may be determined by comparing in-phase and out-of-phase force and displacement values of the material, and the guide 210, to calculate elastic behavior of the sample.

In some examples, the material analyzer 200 may include one or more additional sensors 218 positioned and configured to determine one or more other characteristics and/or properties of the material or the surrounding environment. For example, the sensor 218 may be orientable toward, or placeable in contact with, the material (e.g., when the material is between the feed guide 202 and the exit guide 204), and may be configured to detect one or more of a temperature of the material, a color of the material, a size (e.g., a diameter) of the material, an electrical resistivity of the material, or a tension of the material during characterization by the material analyzer 200. More specifically, the sensor 218 may include, for example, an infrared temperature sensor, a thermocouple, a photoelectric sensor, an infrared or other optical sensor, a resistivity probe, a strain gauge interposed between the feed guide 202 and the exit guide 204, or other sensors known in the art. As another example, the sensor 218 may be orientable toward an environment proximate to the material, and may be configured to detect one or more of an ambient temperature proximate to the material or an ambient humidity proximate to the material. More specifically, the sensor 218 may include, for example, an infrared temperature sensor, a thermocouple, a humidity sensor, a moisture sensor, or other sensors known in the art. The material analyzer 200 may include one, some, or all of the above sensors 218. The sensor 218 or sensors 218 may be in communication with a controller 112 (see FIG. 1), which may utilize the signals from the sensor 218 or sensors 218 to better characterize the material, and to control production and/or use of the material in some embodiments.

In some examples, the feed guide 202, guide 210, and exit guide 204 may be mutually suspended from a shared support 220. For example, the feed guide 202 and the exit guide 204 may be supported on respective brackets 222, which may be secured to a support 220 in the form of a panel. The actuator 208 may likewise be secured to the support 220, and another bracket 222 affixed to an output member of the actuator 208 may carry the guide 210 thereon. The shared support 220 may be, for example, suspended above a platform 224. More specifically, the support 220 may be affixed to one or more beams 226 extending from the platform 224. A height of the feed guide 202 and the exit guide 204 above the platform 224 may be adjustable by, for example, adjusting the position at which the support 220 is affixed to the beams 226.

Figure 3:
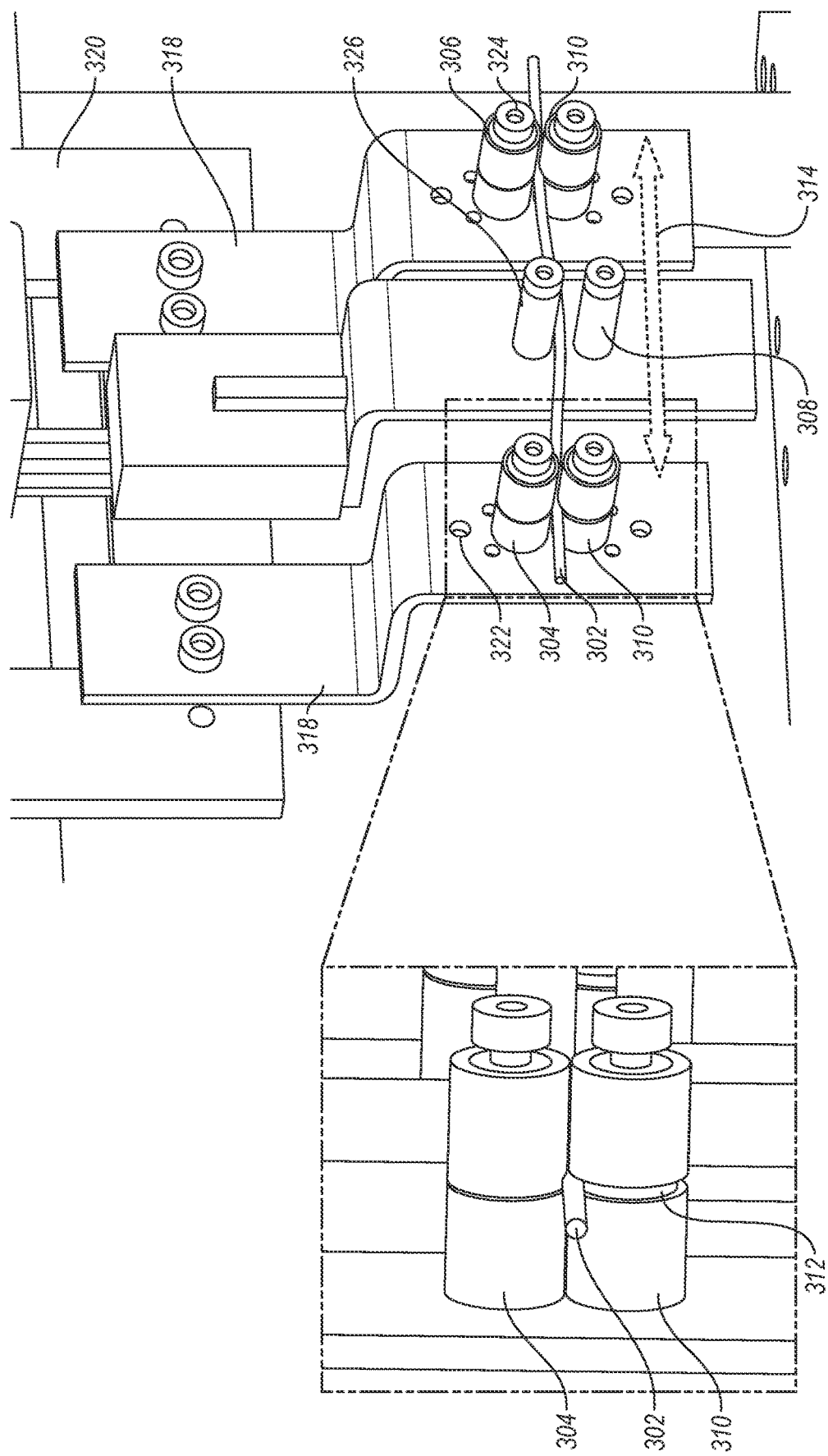
FIG. 3 shows two enlarged views of guides for guiding moving filament, or other extruded or pultruded material, through a material analyzer, such as the material analyzer of FIG. 2.

FIG. 3 shows two enlarged views of guides 304, 306, 308 for guiding moving filament, or other extruded or pultruded material 302, through a material analyzer, such as the material analyzer 200 of FIG. 2. In some examples where one or more of the feed guide 304, the exit guide 306, and the guide 308 interposed therebetween includes rollers 310, a diameter of the rollers 310 may not be constant. For example, the rollers 310 may have variable diameters to guide the material 302 toward lowest-diameter portions of the roller 310. More specifically, the rollers 310 may include a notch 312 (e.g., a channel), and the inclusion and shape of the notch 312 may cause the material 302 to preferentially contact the rollers 310 in alignment with the notch 312. As another more specific example, the rollers 310 may have a curved shape (e.g., a hyperbolic cross-sectional shape) to guide the material 302 toward a lowest-diameter portion of the rollers 310.

In some examples, a material of the rollers 310 may be softer than the material 302 to be received by the rollers 310 within the material analyzer 200 (see FIG. 2). For example, the rollers 310 may include a polymer material (e.g., polyurethane), and may have a Shore durometer of between 30 A and 90 A. Controlling the hardness of the rollers 310 relative to the hardness of the material 302, the distance between the rollers 310, and optionally the shape of the rollers 310 may enable the rollers to better grip the material 302, providing more consistent sample lengths and material tensions between the feed guide 304 and the exit guide 306.

In some examples, a diameter of the roller 310 may be greater than a greatest cross-sectional dimension of the material 302, taken in a direction at least substantially perpendicular to a direction of movement of the material 302 through the rollers 310. For example, the diameter of the roller 310 may be between about 2 times and about 10 times a diameter of the material 302, in examples where the material 302 has an at least substantially circular cross-sectional shape.

In some examples, a distance 314 between the feed guide 304 and the exit guide 306 may be adjustable. For example, the brackets 318 may be securable to the support 320 in several different, laterally adjustable positions, enabling materials 302 of different sizes and properties to be received by the feed guide 304, guide 308, and exit guide 306. More specifically, the support 320 may include multiple holes, posts, or bolts to align with corresponding mating features of the brackets 318. As another more specific example, the support 320 may include slots enabling the brackets 318 to slide to various lateral positions along the slots, with the brackets 318 securable in place utilizing friction (e.g., clamps, bolts and nuts).

In some examples, the position of the feed guide 304, the guide 308, the exit guide 306, or any combination or subcombination of these components may be adjustable. For example, one or more of the brackets 318 may include multiple holes 322 sized and shaped to receive axles 324 on which the rollers 310 may be supported. Repositioning the axles 324 may enable materials 302 of different sizes and/or shapes to be received and analyzed.

In some examples, one or more of the feed guide 304, the guide 308, the exit guide 306 may lack rollers for rotatingly engaging with the material 302. For example, the guide 308 of FIG. 3 lacks the rollers 310 of the feed guide 304 and the exit guide 306. In some such examples, the feed guide 304, the guide 308, the exit guide 306, or any combination or subcombination of these components may include a low-friction (and optionally a high-durability) material to allow the material 302 to slide against the feed guide 304, the guide 308, the exit guide 306 or any combination or subcombination of these components. As a specific, nonlimiting example, the guide 308 of FIG. 3 may include posts 326 having contact surfaces including a nylon material.

Figure 4:
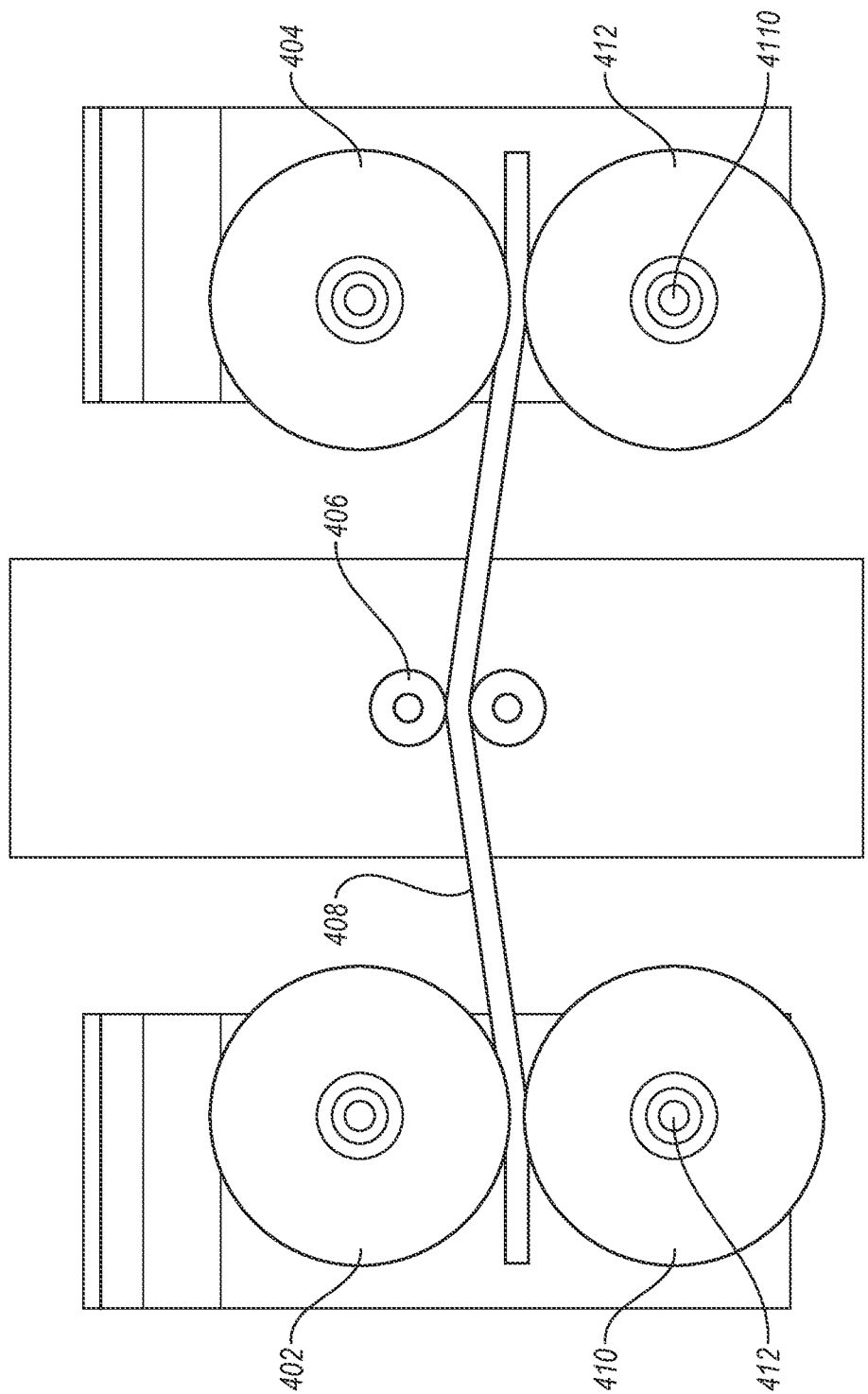
FIG. 4 is a schematic side view of another embodiment of guides for guiding moving filament, or other extruded or pultruded material, through a material analyzer, such as the material analyzer of FIG. 2.

FIG. 4 is a schematic side view of another embodiment of guides 402, 404, 406 for guiding moving filament, or other extruded or pultruded material 408, through a material analyzer, such as the material analyzer 200 of FIG. 2. In some examples, the actuator of the material analyzer may be positioned and oriented to displace the material 408 in a direction at least substantially perpendicular to a feed direction of the material into the feed guide 402, out of the exit guide 404, or into the feed guide 402 and out of the exit guide 404. For example, the actuator may be configured to displace the material 408, and the guide 406 between the feed guide 402 and the exit guide 404, in an at least substantially vertical direction. Continuing the example, the feed guide 402 may be oriented to receive, the exit guide 404 may be oriented to output, or the feed guide 402 may be oriented to receive and the exit guide 404 may be oriented to output the material 408 in an at least substantially horizontal direction.

In some examples, one or more of the rollers 410 may be configured to drive movement of the material 408 through the material analyzer. For example, one or both of the rollers 410 of the feed guide 402, the exit guide 404, or the feed guide 402 and the exit guide 404 may be motorized, and driving the motor(s) 412 may cause the rollers 410 to rotate and urge the material 408 through the material analyzer.

Figure 5:
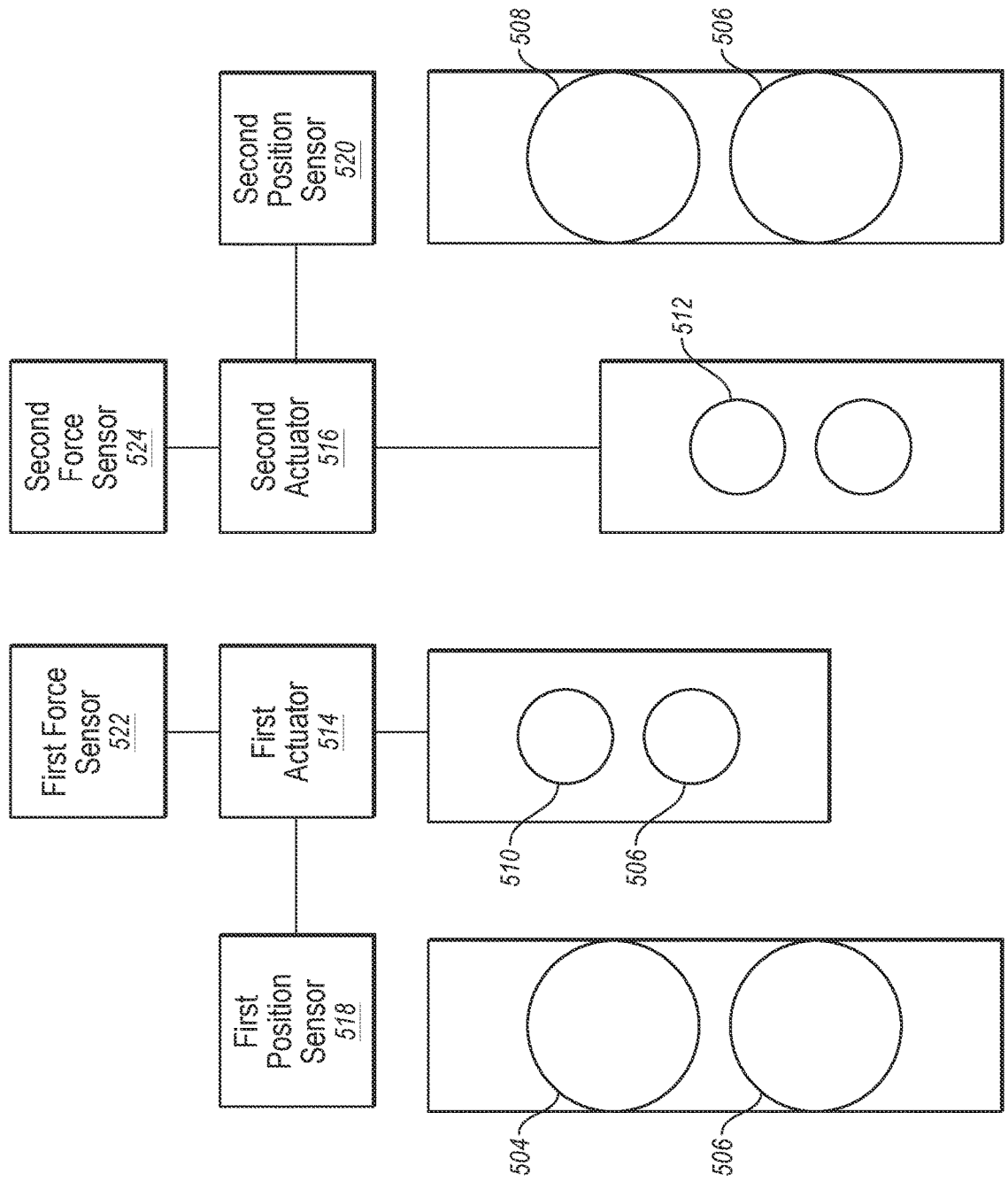
FIG. 5 is a schematic side view of another embodiment of guides for guiding moving filament, or other extruded or pultruded material, through a material analyzer, such as the material analyzer of FIG. 2.

FIG. 5 is a schematic side view of another embodiment of guides 504, 508, 510, and 512 for guiding moving filament, or other extruded or pultruded material, through a material analyzer, such as the material analyzer 200 of FIG. 2. In some examples, the material analyzer may be configured to administer a four-point flexural test to determine one or more properties of the material 104. For example, the material analyzer may include four guides: a feed guide 504 for receiving material to the characterized, a first guide 510 downstream of the feed guide 504, a second guide 512 downstream of the first guide 510, and an exit guide 508 for receiving material from the second guide 512 and for outputting the characterized material from the material analyzer.

For example, the material analyzer may include a first guide 510 supported by a first actuator 514 configured to displace the first guide 510 in a direction at least substantially perpendicular to an axis of rotation of rollers 506 of the first guide 510. The material analyzer may also include a first position sensor 518 positioned and configured to detect the position of the material guided by the first guide 510, the first guide 510 itself, and/or the state of the first actuator 514. The material analyzer may include a first force sensor 522 positioned and configured to detect the force required to actuate the first actuator 514 and place the material at a displacement detected by the first position sensor 518.

The material analyzer may also include a second guide 512 supported by a second actuator 516 configured to displace the second guide 512 in a direction at least substantially perpendicular to an axis of rotation of rollers 506 of the second guide 512. The material analyzer may include a second position sensor 520 positioned and configured to detect the position of the material guided by the second guide 512, the second guide 512 itself, and/or the state of the second actuator 516. The material analyzer may include a second force sensor 524 positioned and configured to detect the force required to actuate the second actuator 516 and place the material at a displacement detected by the second position sensor 520. In other examples, the second guide 512 may be supported by the same first actuator 514 as the first guide 510.

In some examples, the displacement targeted by the first actuator 514 and the second actuator 516 may be at least substantially equal in magnitude and direction. In other examples, the displacement targeted by the first actuator 514 may be different in magnitude, direction, or magnitude and direction from the displacement targeted by the second actuator 516.

Enabling the material analyzer to perform a four-point flexural test may reduce stress concentrations in the material and the material analyzer. Performing a four-point flexural test may provide a more accurate characterization of the material, particularly when the material is heterogeneous (e.g., a composite material).

Figure 6:
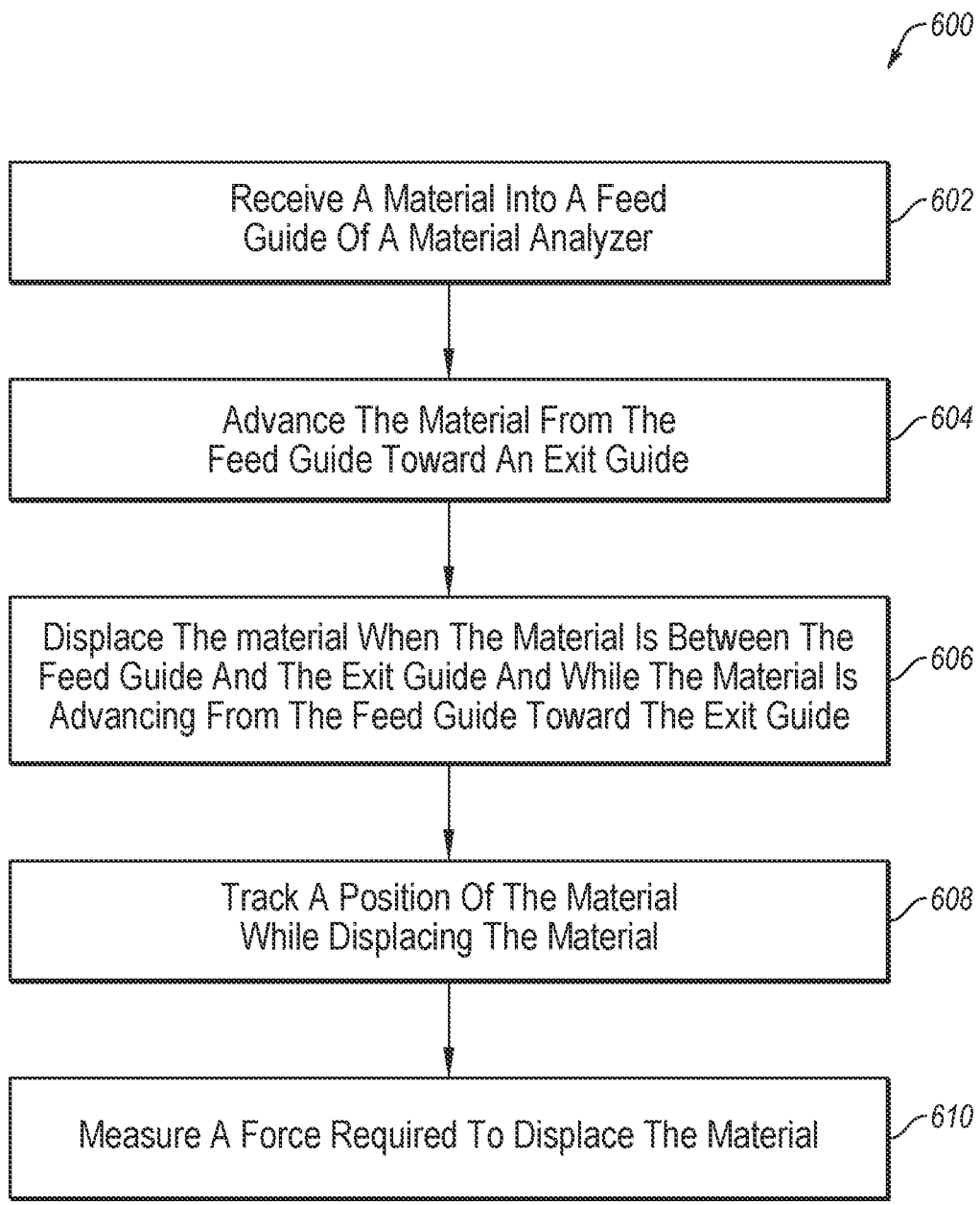
FIG. 6 is a flowchart depicting a method of characterizing a property of a material.

FIG. 6 is a flowchart depicting a method 600 of characterizing a property of a material. The method 600 may involve, for example, receiving a material into a feed guide of a material analyzer, as indicated at act 602. For example, the material may be manually or automatically received from a source and introduced into the feed guide of the material analyzer. The material received into the feed guide may be in the form of, for example, a filament, tape, tube, wire, cable, beam, channel, or fiber including the material. The material received into the feed guide may include, for example, a polymer, metal, glass, carbon, or composite material.

The method 600 may also involve advancing the material from the feed guide toward an exit guide, as indicated at act 604. For example, one or more rollers of the guides themselves may be driven (e.g., by one or more motors) to advance the material in contact with those guides. As another example, an external device (e.g., a rolling spool, a pulling apparatus of an extruder) may provide the force acting on the material to advance the material through the material analyzer.

The material may be displaced when the material is between the feed guide and the exit guide and while the material is advancing from the feed guide toward the exit guide, as indicated at act 606. For example, an actuator supporting or otherwise affixed to one or more guides interposed between the feed guide and the exit guide may be activated to apply force to the material, displacing the material from a shortest path between the feed guide and the exit guide. The displacement of the material may be at least substantially fixed in magnitude in some examples, such that different portions of the material along a length of the material may reach at least substantially the same displacement as the material passes through a guide between the feed guide and the exit guide. In other examples, the displacement of the material may oscillate, such that different portions of the material along the length of the material may reach different displacements as the material passes through a guide between the feed guide and the exit guide.

A position of the material may be tracked while displacing the material, as indicated at act 608. For example, a position sensor may detect the state of the actuator, a position of the material, a position of a guide in contact with the material, or any combination of these indicators. A force required to displace the material may be measured, as indicated at act 610. For example, a force sensor may detect the force required to deflect the material to the displacement measured by the position sensor. In some examples, these measurements may be made while the material is in motion through the guides and through the material analyzer. In other examples, the measurements may be taken while the material is temporarily stationary within the guides and within the material analyzer. Regardless, the material may remain at least substantially contiguous with a source of the material and with a quantity of the material received by a receptacle downstream of the material analyzer.

The method 600 may further involve determining a flexural modulus of the material responsive to tracking the position of the material and measuring the force required to displace the material in some examples. For example, a controller of the material analyzer or of a system of which the material analyzer is a part may calculate the flexural modulus of the material from the detected position of the material and the measured force to displace the material. The controller may also receive a measured size (e.g., diameter) of the material to assist in calculating the flexural modulus. In some examples, the controller may also determine a storage modulus, a loss modulus, or a storage modulus and a loss modulus of the material responsive to tracking the position of the material and measuring the force required to displace the material. In some examples, the controller may further receive additional characteristics relevant to or indicative of properties of the material, such as, for example, electrical resistivity, color, tension during characterization, or any combination or subcombination of these. In some examples, the controller may receive characteristics relevant to or indicative of properties of the environment in which the material is characterized, such as, for example, ambient temperature, ambient humidity, or ambient temperature and ambient humidity. In some examples, the controller may calculate and/or receive one or more of these properties at least substantially continually (e.g., once per clock cycle, once per second, once per minute) and associate the properties with tracked portions of the material. In some examples, the controller may issue control signals to a source of the material or to a receptacle of the material to change how the material is being produced or otherwise provided to the material analyzer (e.g., to improve the likelihood that the material will be within target specifications) or to change how the material is recommended for use or used (e.g., to improve the consistency and reliability of parts additively manufactured utilizing the material).

Material analyzers in accordance with this disclosure may have several advantages over material analyzers known to the inventors. For example, the material analyzers disclosed herein may be utilized in-line with equipment for producing and/or using the materials characterized by the material analyzers, which may improve reliability and consistency due to the determination of the properties of the material proximate to the source or the site of use. In addition, the material analyzers disclosed herein may enable the same material to be used during characterization as is used in a final process (e.g., an additive manufacturing process), improving the accuracy of the sample as a representative of the material in use and reducing waste from providing samples in addition to the material to be used. The material analyzers disclosed herein may provide better and more immediate feedback and feed forward control, increasing consistency of properties during production and/or use of the material. The material analyzers disclosed herein may increase the ability of users to rely on recycled and reused materials as feedstock, reducing waste and improving consistency of parts made with such materials, due to the characterization of the materials. Such material analyzers may also reduce the need to supervise a manufacturing or usage process, due to the automatically provided data enabling feedback and feed forward control. In addition, material analyzers in accordance with this disclosure may enable parts to be made on-site in extreme environments (e.g., in space, on a space station), reducing the need to generate pre-manufactured parts and transport those parts to such environments.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure.

What is claimed is:

1. A material analyzer for testing a property of a material, comprising:
    a feed guide for guiding intake of a material;
    an exit guide, the feed guide and the exit guide configured to allow the material to move through the feed guide and the exit guide while the material is analyzed by the material analyzer;
    an actuator positioned to displace the material when the material is between the feed guide and the exit guide, the material analyzer configured to cause the actuator to oscillate a displacement of the material;
    a position sensor configured to track a position of the actuator; and
    a force sensor configured to measure a force required to cause the actuator to displace the material.

2. The material analyzer of claim 1, wherein the feed guide and exit guide comprise rollers.

3. The material analyzer of claim 2, wherein the rollers comprise variable diameters configured to guide the material toward lowest-diameter portions of the rollers.

4. The material analyzer of claim 2, wherein the actuator is positioned and oriented to displace the material in a direction at least substantially perpendicular to an axis of rotation of at least one of the rollers.

5. The material analyzer of claim 1, wherein a distance between the feed guide and the exit guide is adjustable.

6. The material analyzer of claim 1, further comprising at least one other sensor oriented toward the material or an environment proximate to the material when the material is between the feed guide and the exit guide, the at least one other sensor positioned and configured to detect at least one of a temperature of the material, a color of the material, a size of the material, an electrical resistivity of the material, a tension of the material between the feed guide and the exit guide, an ambient temperature proximate to the material, or an ambient humidity proximate to the material.

7. The material analyzer of claim 1, wherein the material analyzer is configured to cause the actuator to maintain the material at an at least substantially fixed displacement.

8. The material analyzer of claim 1, wherein the material analyzer is configured to cause the actuator to change a force of actuation to at least substantially continuously vary displacement of the material.

9. The material analyzer of claim 1, wherein the actuator is a first actuator and further comprising:
    another actuator positioned to displace the material in a direction opposite a direction of displacement of the first actuator when the material is between the feed guide and the exit guide;
    another position sensor configured to track a position of the other actuator; and
    another force sensor configured to measure another force required to actuate the other actuator to displace the material.

10. A method of characterizing a property of a material, comprising:
    receiving a material into a feed guide of a material analyzer;
    advancing the material from the feed guide toward an exit guide;
    oscillating a displacement distance of the material when the material is between the feed guide and the exit guide and while the material is advancing from the feed guide toward the exit guide;
    tracking a position of the material while displacing the material; and
    measuring a force required to displace the material.

11. The method of claim 10, wherein receiving the material into the feed guide comprises receiving a filament, tape, tube, wire, cable, beam, channel, or fiber comprising the material into the feed guide.

12. The method of claim 10, wherein receiving the material into the feed guide comprises receiving a polymer, metal, glass, carbon, or composite material into the feed guide.

13. The method of claim 10, wherein displacing the material comprises maintaining the material at an at least substantially fixed displacement between the feed guide and the exit guide.

14. The method of claim 10, wherein oscillating the displacement distance of the material between the feed guide and the exit guide comprises changing a force of actuation to at least substantially continuously vary the displacement distance of the material.

15. The method of claim 10, further comprising determining a storage modulus, a loss modulus, or a storage modulus and a loss modulus of the material responsive to tracking the position of the material and measuring the force required to displace the material.

16. The method of claim 10, further comprising determining a flexural modulus of the material responsive to tracking the position of the material and measuring the force required to displace the material.

17. A system for analyzing a property of a material, comprising:
    a source of a material comprising an extruder or a pultruder;
    a material analyzer, comprising:
        a feed guide positioned and configured to receive the material from the source;
        an exit guide, the feed guide and the exit guide configured to allow the material to move through the feed guide and the exit guide while the material is analyzed by the material analyzer;
        an actuator positioned to displace the material when the material is between the feed guide and the exit guide;
        a position sensor configured to track a position of the actuator;
        a force sensor configured to measure a force required to cause the actuator to displace the material; and
        a controller operatively connected to the position sensor and the force sensor, the controller configured to change at least one operational parameter of the extruder or the pultruder at least partially responsive to receiving the position of the actuator from the position sensor and the force required to activate the actuator from the force sensor; and
    a receptacle positioned and configured to receive the material from the material analyzer.

18. The system of claim 17, wherein controller is configured to change a temperature of the extruder or the pultruder at least partially responsive to receiving the position of the actuator from the position sensor and the force required to activate the actuator from the force sensor.

19. The system of claim 18, wherein the controller is configured to change a speed of production of the extruder or the pultruder at least partially responsive to receiving the position of the actuator from the position sensor and the force required to activate the actuator from the force sensor.

20. The system of claim 17, wherein the receptacle comprises a 3D printer or a spool.

* * * * *

UNITED STATES PATENT AND TRADEMARK OFFICE
CERTIFICATE OF CORRECTION

PATENT NO. : 12,130,298 B1
APPLICATION NO. : 17/743866
DATED : October 29, 2024
INVENTOR(S) : James E. Shepherd et al.

It is certified that error appears in the above-identified patent and that said Letters Patent is hereby corrected as shown below:

In the Claims

Claim 18, Column 18, Line 41, change "wherein controller is" to --wherein the controller is--

Signed and Sealed this
Fourth Day of February, 2025

Coke Morgan Stewart
*Acting Director of the United States Patent and Trademark Office*